United States Patent [19]

Boyd

[11] Patent Number: 4,654,563
[45] Date of Patent: Mar. 31, 1987

[54] FLUORESCENT LAMP BALLAST

[75] Inventor: Gerald D. Boyd, Grants Pass, Oreg.

[73] Assignee: Energy Technologies Corp., Grants Pass, Oreg.

[21] Appl. No.: 594,458

[22] Filed: Mar. 28, 1984

[51] Int. Cl.$^4$ .................... H05B 41/14; H01F 27/26
[52] U.S. Cl. .................... 315/244; 315/258; 315/283; 336/160; 336/165; 336/178; 336/234
[58] Field of Search ............ 315/244, 258, 283; 336/178, 212, 160, 165, 234

[56] References Cited

U.S. PATENT DOCUMENTS

| | | | |
|---|---|---|---|
| 2,064,771 | 12/1936 | Vogt | 336/178 |
| 2,418,159 | 4/1947 | Campbell | 315/258 |
| 3,189,859 | 6/1965 | Olsen | 336/212 |
| 3,195,086 | 7/1965 | Taylor | 336/178 |
| 3,602,859 | 5/1970 | Dao | 336/178 |
| 3,535,665 | 10/1970 | Belanger | 336/212 |
| 3,663,913 | 5/1972 | Kato et al. | 336/212 |
| 3,686,561 | 8/1972 | Spreadburg | 323/6 |
| 4,240,057 | 12/1980 | Decher et al. | 336/212 |
| 4,326,182 | 4/1982 | Klaus | 336/212 |
| 4,376,911 | 3/1983 | Kaneda | 315/244 |
| 4,484,107 | 11/1984 | Kanada | 315/244 |
| 4,484,171 | 11/1984 | McLoughlin | 336/178 |

FOREIGN PATENT DOCUMENTS 2305957 8/1974 Fed. Rep. of Germany ...... 336/178
89044 2/1957 Norway ................... 336/178

Primary Examiner—David K. Moore
Assistant Examiner—M. Razavi
Attorney, Agent, or Firm—Diller, Ramik & Wight

[57] ABSTRACT

A circuit containing a ballast for one or more fluorescent lamps. The circuit includes a first inductor in series with a voltage input terminal and a first capacitor to form a series resonant circuit to provide a starting voltage to the lamps. A second, shunt inductors coupled between the first inductor and the capacitor and another input terminal of the circuit to eliminate the high Q of the series resonant circuit and prevent the first inductor from saturating. The inductors are mounted on the legs of an H-shaped core to provide inductive coupling between the inductors and allow a maximum winding area for the first inductor to reduce the series resistance of the lamp current path. The core also allows the shunt inductor to adjust power line power factor independently of lamp power factor. Improvements in system efficiency of up to 15% can be achieved over conventional core/coil type ballasts. An optional circuit portion can be added to the main circuit to turn off the starting circuit when the fluorescent lamps are lit.

11 Claims, 3 Drawing Figures

FLUORESCENT LAMP BALLAST

BACKGROUND OF THE INVENTION

1. Field of the Invention

This invention relates to improvements in ballasts for fluorescent lamps, more particularly, to a ballast circuit which provides power factor correction of lamp current.

2. Description of the Prior Art

For efficient and proper operation of fluorescent lamps, the ballast for the lamps must be provide power factor correction of lamp current. Thus, lamp current must flow through the entire applied AC sign wave cycle and not only during a portion of this cycle. This requirement is necessary to achieve maximum efficiency of light output from the lamp when considered in view of the power input to the lamp. Also, power factor correction is important from the point of view of a public utility supplying electrical power so as to maintain the most efficient energy transfer from power substations to end users of electrical power.

The techniques for power factor correction which have been known and used in the past for fluorescent lamps have generally been complex in construction and operation. Moreover, such techniques have resulted in circuits which are relatively expensive to produce and maintain. A need has therefore existed for improvements in ballasts for fluorescent lamps so that greater economies can be realized in the operation of fluorescent lamps.

SUMMARY OF THE INVENTION

The present invention satisfies the aforesaid need by providing an improved circuit for use as a ballast with one or more fluorescent lamps. The circuit includes a first inductor and a second inductor coupled in such a manner that the second inductor is in shunt relationship to a series resonant circuit defined by the first inductor and a capacitor. The shunt inductor operates to eliminate the high Q of the series resonant circuit and provides greater control of the operating current for a fluorescent lamp. In practice, the circuit Q is dampened to prevent saturation of the first inductor.

The advantages of the ballast of the present invention are enhanced by the use of an improved core which allows mutual coupling between the two inductors yet the core allows maximum winding area for the first inductor to reduce series resistance in the lamp current path. The optimum configuration of the core is substantially an H-shaped configuration with the first inductor being wound as two separate coils in series with each other on first, parallel legs of the core. The shunt inductor is in the form of a pair of coils mounted on the other two legs of the core with the inductors being inductively coupled with each other by virtue of the cross piece of the H-shaped core itself. Smaller core members are secured to the ends of the main H-shaped core to complete the magnetic flux paths for the two inductors.

A major benefit of the use of the core of the type described is that the shunt inductor can be used in conjunction with the first inductor to adjust power line power factor independently of lamp power factor. This advantage allows for maximum system efficiency by minimizing core losses, up to 15% over that achieved with conventional core/coil type ballasts. Moreover, because of the lower core losses associated with this particular inductor-core assembly, the temperature rise of the ballast is significantly lowered with reference to conventional cores for inductors. This feature permits the use of a plastic case to house the ballast itself. This avoids the hazards of electrical shock and allows for the avoidance of environmental testing as has been required, such as by agencies as Underwriter's Laboratories.

The circuit of the present invention also has an optional feature including a circuit portion which assures that the starting circuit will turn off when the lamps coupled to the circuit are lit. This adds to the efficiency of the circuit and minimizes the power required to operate the lamps coupled to the circuit.

The primary object of the present invention is to provide an improved ballast circuit for one or more fluorescent lamps wherein the circuit includes improved components which permit adjustment of the power line power factor independent of lamp power factor so as to maximize the efficiency of operation of the system comprised of the circuit and the lamps.

Another object of the present invention is to provide a circuit of the type described wherein the circuit includes a pair of inductors mounted on an improved core to provide for the adjustment of power line power factor independently of lamp power factor yet the temperature rise due to the operation of the ballast is relatively low so that the ballast itself can be placed in a plastic package to eliminate electrical shock hazards when the ballast is used in conjunction with one or more fluorescent lamps.

Other objects of this invention will become apparent as the following specification progresses, reference being had to the accompanying drawings for an illustration of the invention.

IN THE DRAWINGS

DETAILED DESCRIPTION OF THE INVENTION

Figure 1:
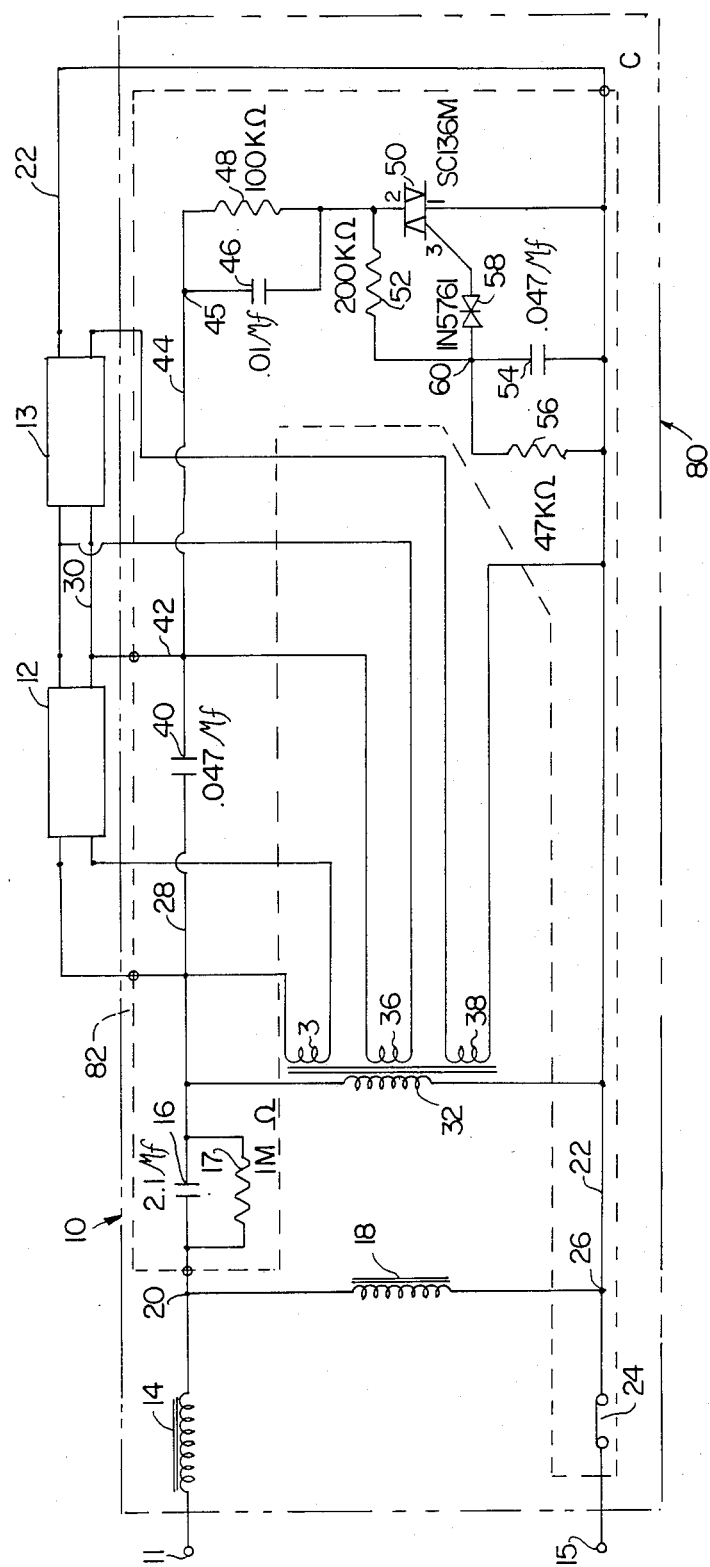
FIG. 1 is a schematic view of a circuit, including an improved ballast, for operating one or more fluorescent lamps.

The circuit of the present invention is broadly denoted by the numeral 10 and is adapted for operating one or more fluorescent lamps. For purposes of illustration, a pair of lamps 12 and 13 are shown in series relationship to each other.

Circuit 10 has a pair of input terminals 11 and 15 across which an AC voltage is impressed. A first inductor 14 is coupled to input terminal 11 and in series with a first capacitor 16. A bleed resistor 17 is across capacitor 16. A second inductor 18 is coupled to a point 20 common to first inductor 14 and first capacitor 16. The opposite end of the inductor 18 is coupled to a lead 22. Thermal switch 24 is coupled between terminal 15 and point 26 on lead 22. Lead 22 is coupled to lamp 13, and capacitor 16 is coupled by a lead 28 to capacitor 40 and to lamp 12.

A transformer 32 has a primary winding coupled across leads 22 and 28 and has three secondary windings 34, 36 and 38 coupled to heater terminals of lamps 12 and 13. Thus, heater voltages are supplied to the lamps when the primary winding of transformer 32 is energized.

A second capacitor 40 is coupled in series with lead 28 and is coupled by a lead 42 to lead 30. Capacitor 40 is coupled by a lead 44 to one end of a voltage divider comprised of resistors 48, 52 and 56. A third capacitor 46 is in a parallel with a resistor 48. A Triac 50 is between resistor 48 and lead 22, resistor 52 being parallel to Triac 50 and Diac 58. A fourth capacitor 54 is in parallel with resistor 56, capacitor 54 and resistor 56 being also coupled to lead 22. A Diac 58 is coupled to the gate of Triac 50 and to the junction 60 between resistors 52 and 56.

First inductor 14 and first capacitor 16 define a series resonant circuit. A typical value for inductor 14 is two henries, and a typical value for capacitor 16 is two microfarads. Inductor 14 is typically a high Q inductor, and the values mentioned above are selected to form a tuned circuit at 80 Hz with an input voltage of 277 volts RMS. Inductor 14 must be gapped to prevent core saturation.

Without inductor 18 in circuit 10, the series resonant circuit comprised of inductor 14 and capacitor 16 has a serious problem in that the high Q of this tuned circuit will cause a very large increase in voltage across the two circuit components, namely, inductor 14 and capacitor 16. Because the frequency of 80 Hz is harmonically related to 60 Hz, there is a very large increase of current through inductor 14, resulting in saturation of the core of this inductor. Thus, without inductor 18 in circuit 10, the circuit is not practical for power factor correction. With the use of inductor 18, the problems associated with power factor correction are eliminated.

Inductor 18, when it is in circuit 10 and the circuit is in operation, swamps out or eliminates the high Q of the series resonant circuit comprised of inductor 14 and capacitor 16. Moreover, the use of inductor 18 provides a storage element to improve lamp performance. If the value of inductor 18 is chosen to be 50 henries, the circuit Q will be dampened and inductor 14 will be prevented from saturating so as to prevent the Q of the circuit associated with inductor 14 from operating out of control.

A further refinement of circuit 10 is to provide for a common core for inductors 14 and 18. The performance of circuit 10 is also improved by adding mutual coupling between inductors 14 and 18.

Figure 2:
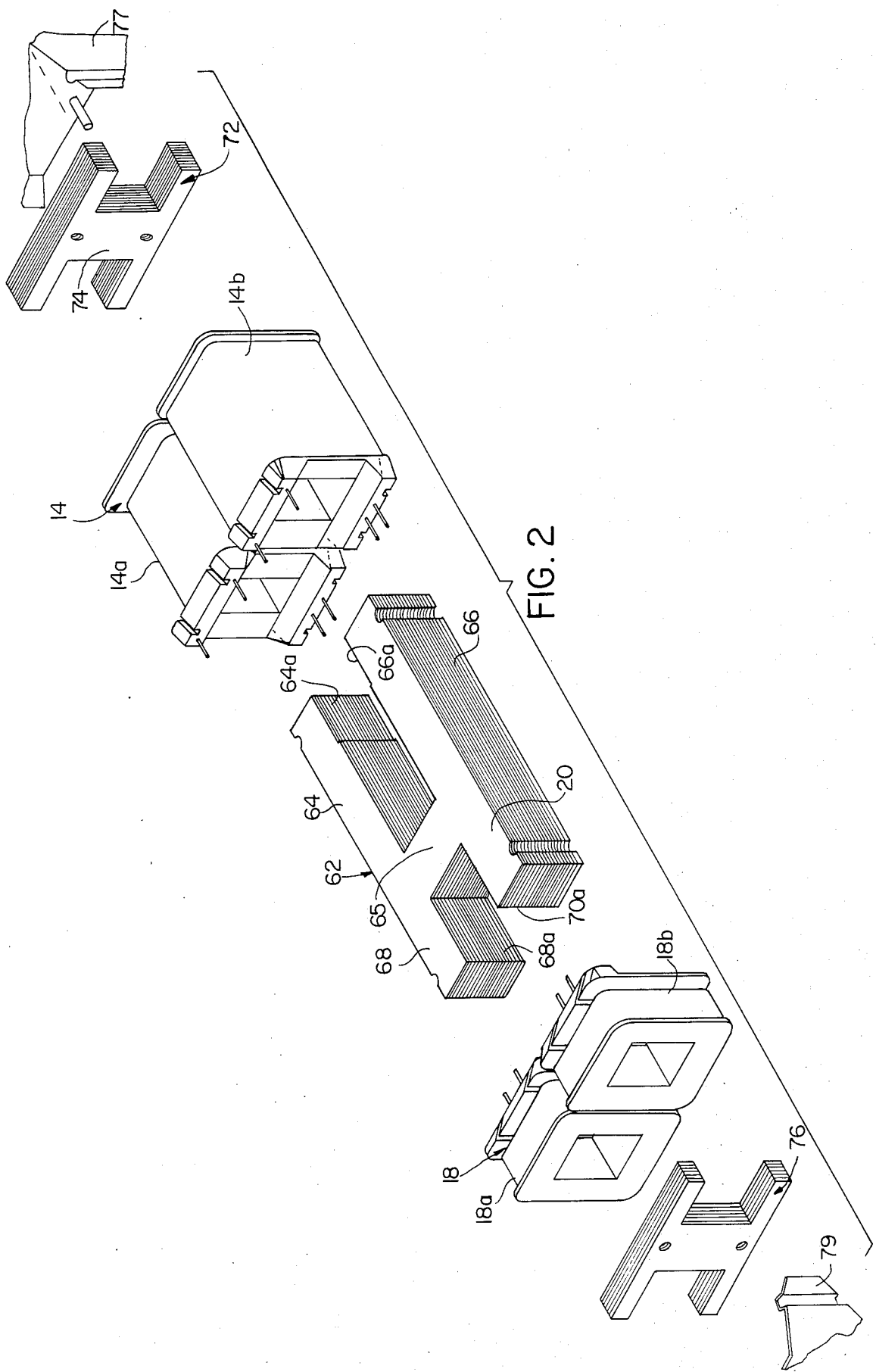
FIG. 2 is an exploded view of a pair of inductors on an H-shaped core, the inductor and core forming parts of the ballast.

To facilitate the mutual coupling of inductors 14 and 18, a special new type of core is used. This new core is broadly denoted by the numeral 62 and is shown in FIG. 2 as being substantially H-shaped in configuration. Core 62 allows maximum winding area for inductor 14 and also reduces the series resistance in the lamp current path.

Core 62 is made up of a stack of lamination which typically are arranged so that the core has a height of about 0.625 inch. A typical stack is 45 pieces which are 0.014 inch thick. Core 62 has a pair of relatively long legs 64 and 66, a pair of relatively short legs 68 and 70, and a cross piece 65 which provides for the mutual coupling between the inductors.

Inductor 14 is comprised of a pair of windings 14a and 14b on bobbin bodies and in series with each other, the windings 14a and 14b being mounted on legs 64 and 66, respectively. To complete the flux paths in legs 64 and 66, an H-shaped core member 72 is coupled to the ends of legs 64 and 66 such that part 74 of core member 72 bridges the gap between the inner faces 64a and 66a (FIG. 2) of legs 64 and 66.

Inductor 18 includes a pair of windings 18a and 18b on bobbin bodies and in series with each other and mounted on legs 68 and 70, respectively, of core 62. The common point 20 between inductors 14 and 18 is shown as an electrical connection in FIG. 3. To complete the magnetic flux path between legs 68 and 70, an H-shaped core member 76 is provided between the inner end faces 68a and 70a of legs 68 and 70 (FIG. 2). Lamination fasteners 77 and 79 are used to hold core members 72 and 76 in place. Fastener 77 is non-magnetic and fastener 79 is magnetic.

Figure 3:
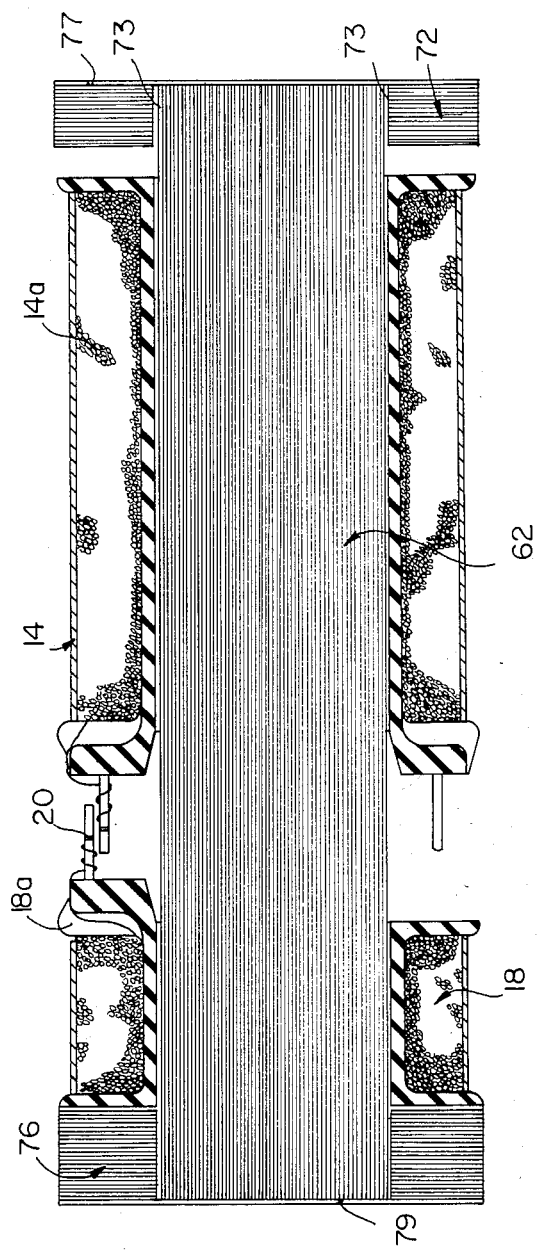
FIG. 3 is a section through the core, showing the way in which the inductors are mounted on the core and are inductively coupled with each other.

FIG. 3 shows the inductors 14 and 18 mounted in operative positions on core 62. It is to be noted that core member 72 has a magnetic gap 73 between core member 72 and core 62 as shown in FIG. 3 to prevent core saturation. Typically, this gap is about 0.030 inch. The core member 76 for inductor 18 has no gap and forms an interference fit to allow maximum flux coupling. The coils of inductors 14 and 18 are wired to allow series aiding of magnetic fields.

Another aspect of core 62 is that it is formed of grain oriented silicon steel to reduce core losses. Because of the much longer flux path associated with inductor 14, the magnetic flux is distributed over a much larger core length, resulting in less localized saturation and thereby less core loss or heating.

The shunt inductor 18 is used in conjunction with inductor 14 to adjust power line power factor independent of lamp power factor. This advantage allows for maximum system efficiency. The unique H core configuration results in improvement of system efficiency of up to 15% over conventional core/coil type ballasts.

Because of the much lower core loss associated with this H-shaped core assembly, the temperature rise of the ballast of circuit 10 is drastically lowered when compared with conventional ballasts. This procedure permits the use of a plastic case as the housing for the ballast. A plastic case has several advantages, one of which is to remove the hazard of electrical shock between the case and the input/output leads of the circuit. The requirement of Underwriter's Laboratories is for a 100% line test for electrical breakdown between a metal case and the wiring of a ballast. The present invention, using a plastic case, removes this requirement altogether. Such a case is shown in FIG. 1 and denoted by the numeral 80. It encloses all components of circuit 10. Also, all circuit components, except for inductors 14 and 18 and transformer 32, can be mounted on a printed circuit board 82 shown in dashed lines in FIG. 1.

Capacitor 40 of circuit 10 (FIG. 1) is used as a starting aid for lamp 13. However, to maintain a positive means for starting all lamps, the special circuit using Triac 50 and Diac 58 has been added to the ballast.

The operation of this special circuit is as follows: When the lamp 12 is not lit, the voltage at point 45 (FIG. 1) will be 400 volts peak. This voltage level will, through resistive voltage divider, including resistors 48, 52 and 56, cause Diac 58 to trigger Triac 50. The Triac will turn on, and then back off again because the holding current requirement cannot be met. This action of the Triac will result in a voltage spike being developed and coupled through capacitor 46. This voltage spike will appear at lead 30, common to the two lamps and will force one of the lamps to start conduction.

When both lamps are lit, the voltage at point 45 will drop to 100 volts peak. This voltage level will cause Diac 58 to fail to reach turn-on level so as not to trigger Triac 50. This action assures that the starting circuit will be turned off whenever the lamps are lit. Resistor 48 can be of a very high value to minimize power wasted by the starting circuit. Resistors 52 and 56 can be set to determine the voltage of the starting spike. Capacitor 54 is selected to place the turn on point of Triac 50 at the peak of the AC sign wave.

I claim:

1. An electronic ballast unit for a fluorescent lamp comprising:

a circuit assembly having a pair of voltage input terminals and a first inductor and a capacitor in series relationship with each other to form a series resonant circuit, said circuit adapted to be coupled to a fluorescent lamp to provide a starting voltage for the lamp; and a second inductor connected in shunt relationship to the first inductor and connected to the other input terminal, there being a core on which the first inductor and the second inductor are mounted, said core inductively coupling the inductors with each other and being of a shape to reduce core losses to minimize the increase of temperature of the core; said core is of a generally H-shaped configuration, and means at opposite ends of said H-shaped core to complete the magnetic flux path for each inductor, respectively.

2. An electronic ballast unit as set forth in claim 1, wherein the core is H-shaped in configuration.

3. An electronic ballast unit as set forth in claim 1, wherein the core is H-shaped to present a first pair of legs, a second pair of legs and a cross piece at the junctions of adjacent first and second legs.

4. An electronic ballast unit as set forth in claim 3, wherein the first inductor is comprised of a pair of windings mounted on respective first legs, the shunt inductor including a pair of windings mounted on respective second legs, whereby the cross piece provides inductive coupling between the windings of the inductors.

5. An electronic ballast unit as set forth in claim 3, wherein said magnetic flux path completion means includes an end core member for each of the first legs and the second legs, respectively, the end core members being coupled to respective legs to complete the flux paths for the corresponding inductors.

6. An electronic ballast unit as set forth in claim 1, wherein is provided a housing for the circuit, said housing being of plastic material.

7. An electronic ballast unit as set forth in claim 1, wherein is included a circuit portion coupled with said circuit assembly to provide a voltage spike for use in starting a lamp coupled to a circuit assembly.

8. An electronic ballast unit as set forth in claim 1, wherein the first inductor has an inductance of about 2 henries, the shunt inductor having an inductance of about 50 henries, and the capacitor having a capacitance of about 2 microfarads.

9. An electronic ballast unit as set forth in claim 7, wherein the input voltage to the terminals is approximately 277 volts RMS and the frequency of the input voltage is approximately 60 Hz.

10. An electronic ballast unit as set forth in claim 1, wherein said magnetic flux path completion means includes an H-shaped core member coupled to said H-shaped core at each of the opposed ends thereof.

11. An electronic ballast unit as set forth in claim 5, wherein the core member associated with the first inductor presents a gap for the first inductor to prevent saturation thereof.

* * * * *